US012786974B2

(12) United States Patent
Tiirola et al.

(10) Patent No.: US 12,786,974 B2
(45) Date of Patent: Nov. 3, 2026

(54) CONFIGURING BANDWIDTH PARTS (BWP) BASED ON AN INDICATION RELATING TO ADC/DAC RESOLUTION

(71) Applicant: Nokia Technologies Oy, Espoo (FI)

(72) Inventors: Esa Tapani Tiirola, Oulu (FI); Toni Harri Henrikki Lahteensuo, Espoo (FI)

(73) Assignee: Nokia Technologies Oy, Espoo (FI)

( * ) Notice: Subject to any disclaimer, the term of this patent is extended or adjusted under 35 U.S.C. 154(b) by 205 days.

(21) Appl. No.: 18/685,786

(22) PCT Filed: Aug. 31, 2021

(86) PCT No.: PCT/US2021/071314
§ 371 (c)(1),
(2) Date: Feb. 22, 2024

(87) PCT Pub. No.: WO2023/033854
PCT Pub. Date: Mar. 9, 2023

(65) Prior Publication Data
US 2024/0397497 A1 Nov. 28, 2024

(51) Int. Cl.
*H04W 72/0453* (2023.01)
*H04W 72/54* (2023.01)

(52) U.S. Cl.
CPC ....... *H04W 72/0453* (2013.01); *H04W 72/54* (2023.01)

(58) Field of Classification Search
None
See application file for complete search history.

(56) References Cited

U.S. PATENT DOCUMENTS

2011/0069975 A1* 3/2011 Liu ...................... H04B 10/675 398/202
2016/0006530 A1* 1/2016 Nazarathy ........... H04L 27/2636 398/76

(Continued)

FOREIGN PATENT DOCUMENTS

CN 111713070 A 9/2020

OTHER PUBLICATIONS

"3rd Generation Partnership Project; Technical Specification Group Radio Access Network; NR; Radio Resource Control (RRC) protocol specification (Release 15)", 3GPP TS 38.331, V15.13.0, Mar. 2021, pp. 1-540.
International Search Report and Written Opinion received for corresponding Patent Cooperation Treaty Application No. PCT/US2021/071314, dated May 27, 2022, 24 pages.
Lin et al., "A Primer on Bandwidth Parts in 5G New Radio", arXiv, Apr. 2, 2020, pp. 1-7.

(Continued)

*Primary Examiner* — Christopher T Wyllie
(74) *Attorney, Agent, or Firm* — Lippes Mathias LLP

(57) ABSTRACT

A method comprising: performing initial access using a first DL BWP associated with a low dynamic range for ADC and/or a first UL BWP associated with a low dynamic range for DAC; indicating UE capability to the gNB, the UE capability indicating that the UE is capable of operating with a high dynamic range for at least one of ADC and DAC; receiving an indication from the gNB, the indication instructing the UE to start operating with a second DL BWP associated with a high dynamic range for ADC and/or a second UL BWP associated with a high dynamic range for DAC; and receiving at least one PDSCH via the second DL BWP and/or transmit at least PUSCH via the second UL BWP.

18 Claims, 9 Drawing Sheets

(56) References Cited

U.S. PATENT DOCUMENTS

| | | | | |
|---|---|---|---|---|
| 2016/0094253 | A1* | 3/2016 | Weber | H04B 1/0475 455/114.3 |
| 2017/0012640 | A1* | 1/2017 | Kong | H04B 1/66 |
| 2019/0207636 | A1 | 7/2019 | Luo et al. | |
| 2021/0037445 | A1* | 2/2021 | Abedini | H04L 5/0048 |
| 2022/0045742 | A1* | 2/2022 | Abedini | H04W 72/0453 |
| 2022/0045745 | A1* | 2/2022 | Abedini | H04B 7/15528 |
| 2022/0167269 | A1* | 5/2022 | Horn | H04W 52/365 |
| 2022/0190837 | A1* | 6/2022 | Horn | H03M 1/007 |
| 2022/0190838 | A1* | 6/2022 | Horn | H04L 1/0009 |
| 2022/0190963 | A1* | 6/2022 | Horn | H04L 1/1657 |
| 2023/0086455 | A1* | 3/2023 | Liu | H03M 1/121 359/337 |
| 2024/0397497 | A1* | 11/2024 | Tiirola | H04W 72/54 |

OTHER PUBLICATIONS

"PSD imbalance in inter-band DL CA", 3GPP TSG-RAN WG4 Meeting #94-e, R4-2000395, Agenda: 8.14.1.7, Intel Corporation, Feb. 24-Mar. 6, 2020, pp. 1-5.

"On absolute level ACLR for mm-wave bands", 3GPP TSG-RAN WG4 #84, R4-1708123, Agenda: 9.3.5.2, Ericsson, Aug. 21-25, 2017, pp. 1-3.

"Physical layer UE capability aspects of broadcast/unicast superposition", 3GPP TSG RAN WG1 Meeting #46bis, R1-062539, Agenda: 6.14, Samsung, Oct. 9-13, 2006, pp. 1-4.

Office action received for corresponding Chinese Patent Application No. 202180101936.1, dated Aug. 10, 2026, 11 pages of office action and no page of translation available.

* cited by examiner

Low resolution DAC. EVM contribution from DAC linear PA. DFT-s-OFDM

Low PAR waveform

| PI/2-BPSK FDSS | | |
|---|---|---|
| Allocation [PRB] | 2 bits DAC | 4 bits DAC |
| 4 | 4.36% | 3.74% |
| 8 | 3.94% | 3.86% |
| 16 | 3.95% | 3.83% |
| 32 | 4.02% | 3.83% |
| 64 | 4.39% | 3.97% |
| 128 | 5.38% | 4.34% |
| 256 | 7.99% | 5.88% |

| QPSK | | |
|---|---|---|
| Allocation [PRB] | 2 bits DAC | 4 bits DAC |
| 4 | 14.05% | 2.60% |
| 8 | 14.08% | 2.54% |
| 16 | 14.10% | 2.57% |
| 32 | 14.26% | 2.62% |
| 64 | 14.38% | 2.75% |
| 128 | 14.70% | 3.17% |
| 256 | 16.04% | 4.39% |

Close to EVM limit (17.5 %)

Low PAR waveform

| QPSK FDSS 25% extension | | |
|---|---|---|
| Allocation [PRB] | 2 bits DAC | 4 bits DAC |
| 4 | 6.01% | 2.68% |
| 8 | 5.82% | 2.53% |
| 16 | 5.76% | 2.63% |
| 32 | 5.92% | 2.44% |
| 64 | 6.06% | 2.55% |
| 128 | 6.47% | 2.83% |
| 256 | 8.12% | 4.06% |

| 16QAM | | |
|---|---|---|
| Allocation [PRB] | 2 bits DAC | 4 bits DAC |
| 4 | 18.54% | 2.48% |
| 8 | 18.63% | 2.97% |
| 16 | 18.75% | 2.53% |
| 32 | 18.68% | 2.55% |
| 64 | 18.77% | 2.69% |
| 128 | 19.05% | 3.22% |
| 256 | 20.18% | 4.56% |

| 64QAM | | |
|---|---|---|
| Allocation [PRB] | 2 bits DAC | 4 bits DAC |
| 4 | 17.86% | 2.50% |
| 8 | 18.80% | 2.86% |
| 16 | 18.25% | 2.47% |
| 32 | 18.15% | 2.48% |
| 64 | 18.19% | 2.63% |
| 128 | 18.47% | 3.17% |
| 256 | 19.76% | 4.44% |

Larger than EVM limit

FIG. 7

CONFIGURING BANDWIDTH PARTS (BWP) BASED ON AN INDICATION RELATING TO ADC/DAC RESOLUTION

RELATED APPLICATION

This application was originally filed as PCT Application No. PCT/US2021/071314 on 31 Aug. 2021, which is incorporated herein by reference in its entirety.

TECHNICAL FIELD

The example and non-limiting embodiments relate generally to UL/DL communication and, more particularly, to bandwidth part arrangement.

BACKGROUND

It is known, in initial BWP configuration, to use an initial BWP configuration.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: perform initial access according to a first bandwidth part configuration; indicate, to a base station, a capability for performing communication with a higher resolution than a resolution associated with the first bandwidth part configuration; and receive, from the base station, an indication to perform communication according to a second bandwidth part configuration.

In accordance with one aspect, a method comprising: performing initial access according to a first bandwidth part configuration; indicating, to a base station, a capability for performing communication with a higher resolution than a resolution associated with the first bandwidth part configuration; and receiving, from the base station, an indication to perform communication according to a second bandwidth part configuration.

In accordance with one aspect, an apparatus comprising means for performing: initial access according to a first bandwidth part configuration; indicating, to a base station, a capability for performing communication with a higher resolution than a resolution associated with the first bandwidth part configuration; and receiving, from the base station, an indication to perform communication according to a second bandwidth part configuration.

In accordance with one aspect, a non-transitory computer-readable medium comprising program instructions stored thereon which, when executed with at least one processor, cause the at least one processor to: perform initial access according to a first bandwidth part configuration; indicate, to a base station, a capability for performing communication with a higher resolution than a resolution associated with the first bandwidth part configuration; and receive, from the base station, an indication to perform communication according to a second bandwidth part configuration.

In accordance with one aspect, an apparatus comprising: at least one processor; and at least one memory including computer program code; the at least one memory and the computer program code configured to, with the at least one processor, cause the apparatus at least to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

In accordance with one aspect, a method comprising: performing initial access, for a user equipment, according to a first bandwidth part configuration; receiving a capability of the user equipment for performing communication with a higher resolution than a resolution associated with the first bandwidth part configuration; and transmitting an indication to indicate to the user equipment to perform communication according to a second bandwidth part configuration.

In accordance with one aspect, an apparatus comprising means for performing: initial access, for a user equipment, according to a first bandwidth part configuration; receiving a capability of the user equipment for performing communication with a higher resolution than a resolution associated with the first bandwidth part configuration; and transmitting an indication to indicate to the user equipment to perform communication according to a second bandwidth part configuration.

In accordance with one aspect, a non-transitory computer-readable medium comprising program instructions stored thereon which, when executed with at least one processor, cause the at least one processor to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

BRIEF DESCRIPTION OF THE DRAWINGS

The foregoing aspects and other features are explained in the following description, taken in connection with the accompanying drawings, wherein:

FIG. 7 is a diagram illustrating features as described herein;

DETAILED DESCRIPTION OF EMBODIMENTS

Figure 1:
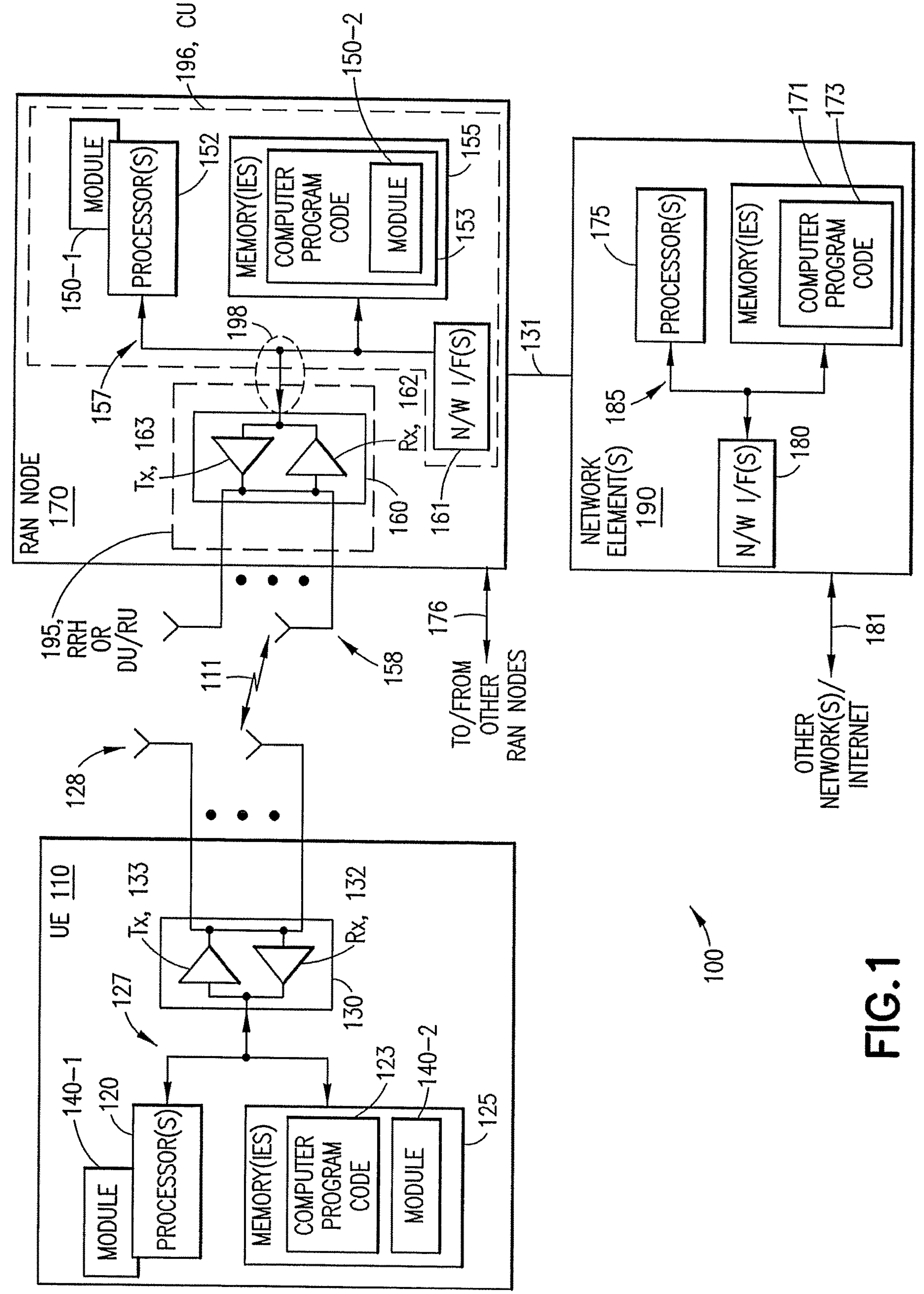
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
ADC analog to digital converter
AE antenna element
AMF access and mobility management function
BWP bandwidth part
CEPT European Conference of Postal and Telecommunications (a regulation body)
CORESET control resource set
CU central unit
DAC digital to analog converter
DFT-S-OFDM Discrete Fourier transform spread orthogonal frequency division multiplexing
DL downlink
DU distributed unit
ECC European Electronic Communications Committee
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
ENOB equivalent number of bits
E-UTRA evolved universal terrestrial radio access, i.e., the LTE radio access technology
EVM error vector magnitude
FDM frequency division multiplexing
gNB (or gNodeB) base station for 5G/NR, i.e., a node providing NR user plane and control plane protocol terminations towards the UE, and connected via the NG interface to the 5GC
I/F interface
IAB integrated access and backhaul, or integrated access backhauling
L1 layer 1
LNA low-noise amplifier
LTE long term evolution
MAC medium access control
MIB master information block
MIMO multiple in, multiple out
MME mobility management entity
MT mobile termination
MTK Mediatek
ng or NG new generation
ng-eNB or NG-eNB new generation eNB
NR new radio
N/W or NW network
OFDM orthogonal frequency division multiplex
PA power amplifier
PAPR peak to average power ratio
PBCH physical broadcast channel
PDCCH physical downlink control channel
PDCP packet data convergence protocol
PDSCH physical downlink shared channel
PHY physical layer
PRACH physical random access channel
PRB physical resource block
QAM quadrature amplitude modulation
QPSK quadrature phase shift keying
RA random access
RAN radio access network
RB resource block (a.k.a. PRB=physical resource block)
REC recommendation
RF radio frequency
RLC radio link control
RRC radio resource control
RRH remote radio head
RS reference signal
radio unit RU
Rx receiver
SDAP service data adaptation protocol
SGW serving gateway
SIB system information block
SMF session management function
SSB synchronization signal block
TDM time division multiplexing
TS technical specification
Tx transmitter
TXU transmitter unit
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

Figure 2:
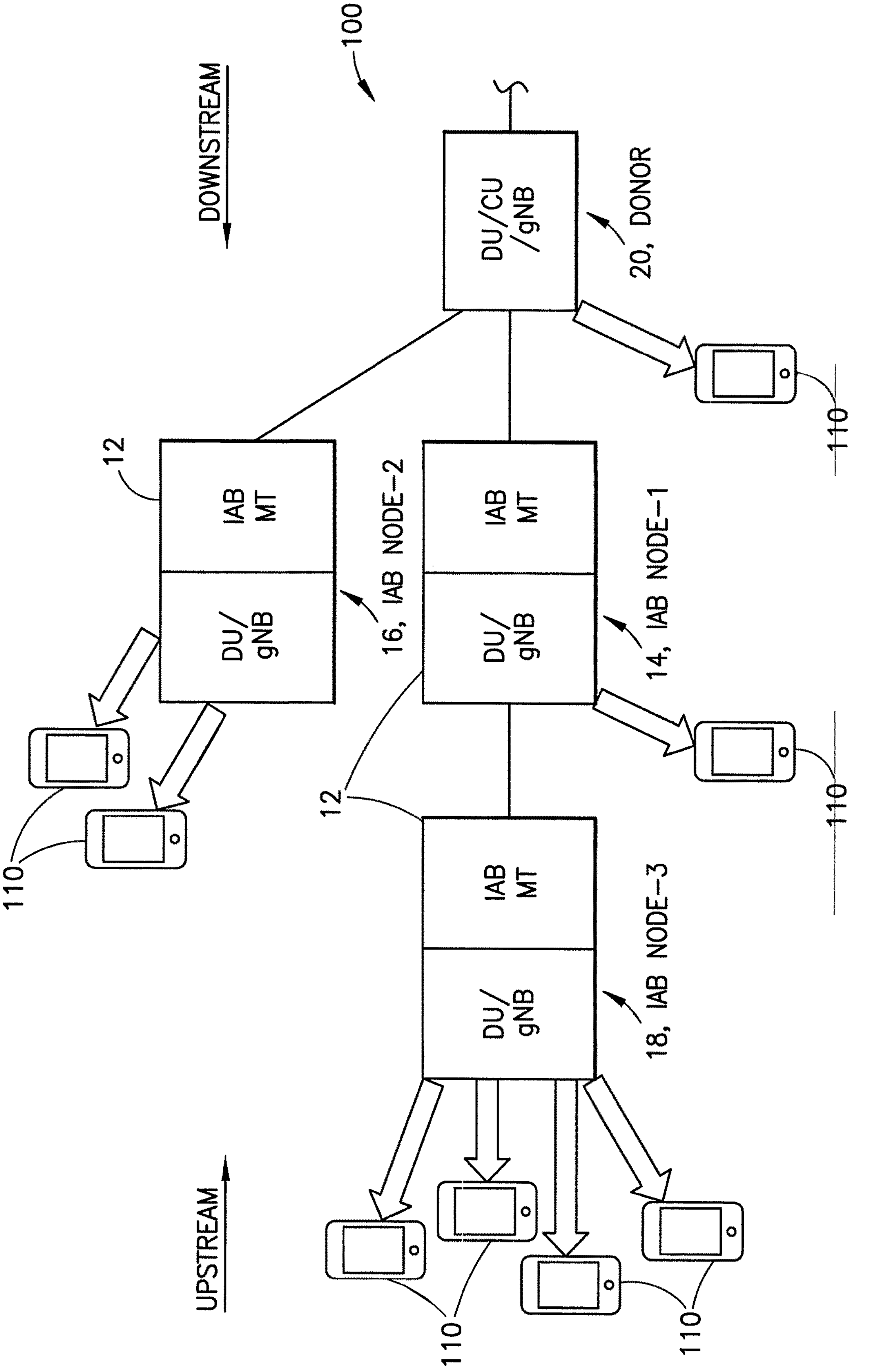
FIG. 2 is a schematic diagram illustrating an example of various devices in a network.

In some example embodiments, the RAN node 170 may be a relay node, such as an integrated access and backhaul (IAB) node. In the IAB scenario, gNB operations may be performed by a distributed unit (DU), and UE operations may be performed by a mobile termination (MT) part of the IAB node. Referring now to FIG. 2, a schematic diagram illustrating an example of various devices in a network 100 is shown. The network 100 in this example supports a multi-hop self-backhaul whereby 5G may be used to transport packets between Integrated Access and Backhaul (IAB) nodes (12) and a Donor (20), such as with a fiber connection to the Next Generation Core (NG-Core or NGC) or Evolved Packet Core (EPC) for example. In this example three (3) IAB nodes 12 are shown: IAB Node-1, 14; IAB Node-2, 16; and IAB Node-3, 18. However, more or fewer nodes 12 may be provided, and their topology may vary. FIG. 2 also shows a Donor 20 and various User Equipments (UEs) 110. Each IAB node consists, logically, of a Mobile Termination (MT) (e.g. IAB MT) that communicates with upstream nodes, and a RAN component, such as a Distributed Unit (DU) (e.g. IAB DU), that communicates with downstream IAB nodes or subscriber UEs 110. In other words, the MT part of an IAB node may be used to communicate with a parent node, and the DU part of an IAB node may be used to communicate with a child node or UE.

Referring now to FIG. 1, the RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless may implement network 100 virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 3:
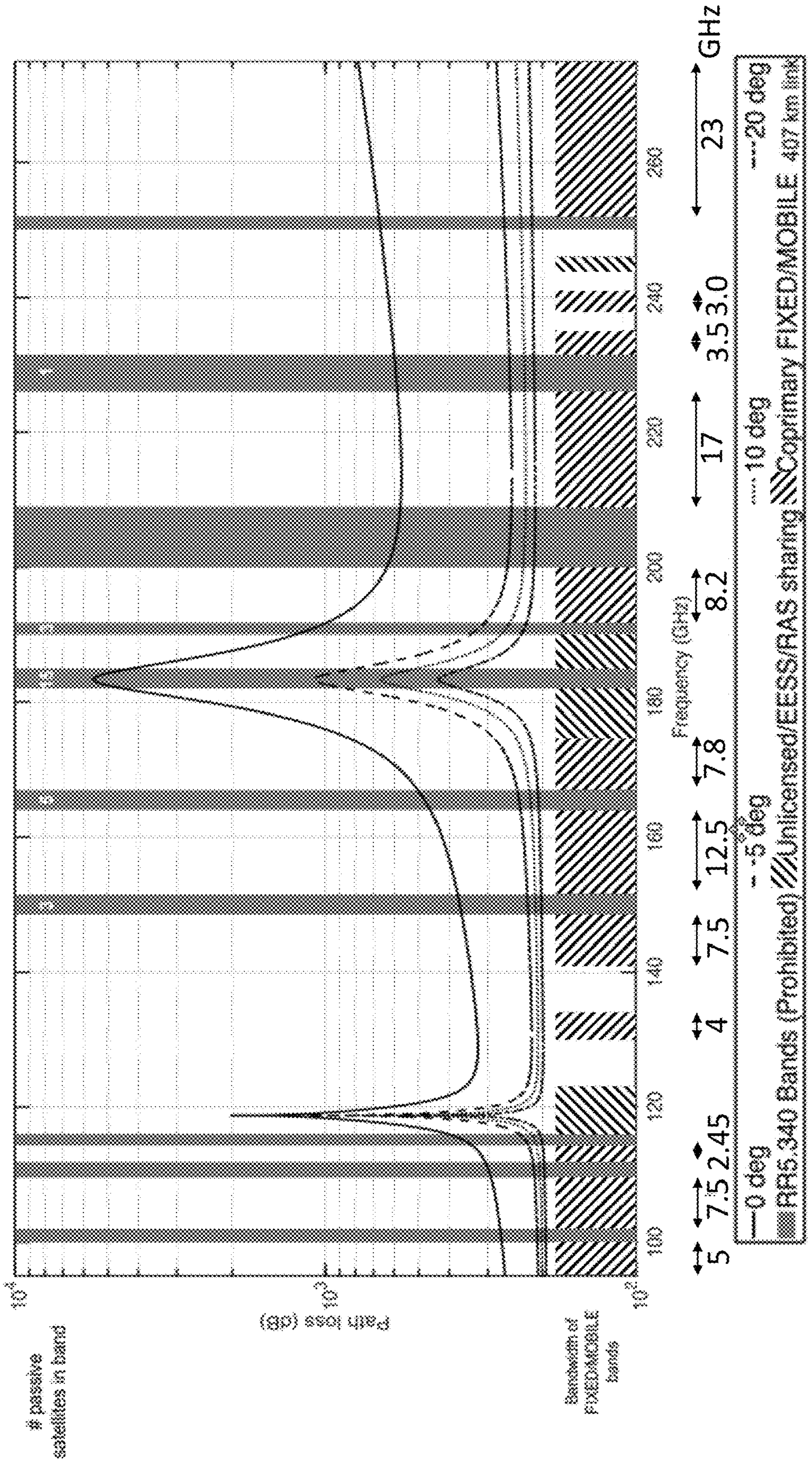
FIG. 3 is a diagram illustrating features as described herein.

Features as described herein generally relate to Sub-THz (>71 GHz) scenarios, for example in NR Rel-18/19, and/or 6G. The frequency bands in this region include, for example, W-band (75 to 110 GHz) and D-band (110 to 170 GHz), as illustrated in the Sub-THz spectrum overview of FIG. 3. It may be seen that the amount of spectrum is high, but there are also restrictions for the band usage, such as RR5.340 (310), where all emissions are prohibited (i.e. passive satellite band). Example embodiments of the present disclosure are not limited to operation in Sub-THz scenarios; example embodiments may also be applied in other frequency ranges, such as FR2-1 (FR2 below 52.6 GHZ), and/or FR2-2 (52.6-71 GHZ).

European telecommunications regulator CEPT ECC has approved two recommendations for Fixed Service (FS) above 92 GHz: W Band ECC Recommendation ECC/REC/(18)02 on frequencies 92-114.25 GHz; and D Band ECC Recommendation ECC/REC/(18)01 on frequencies 130-174.8 GHz. In 3GPP, W-band is considered as a scenario for NR Rel-18/19. The other bands may be considered for Rel-20 and beyond.

Figure 4:
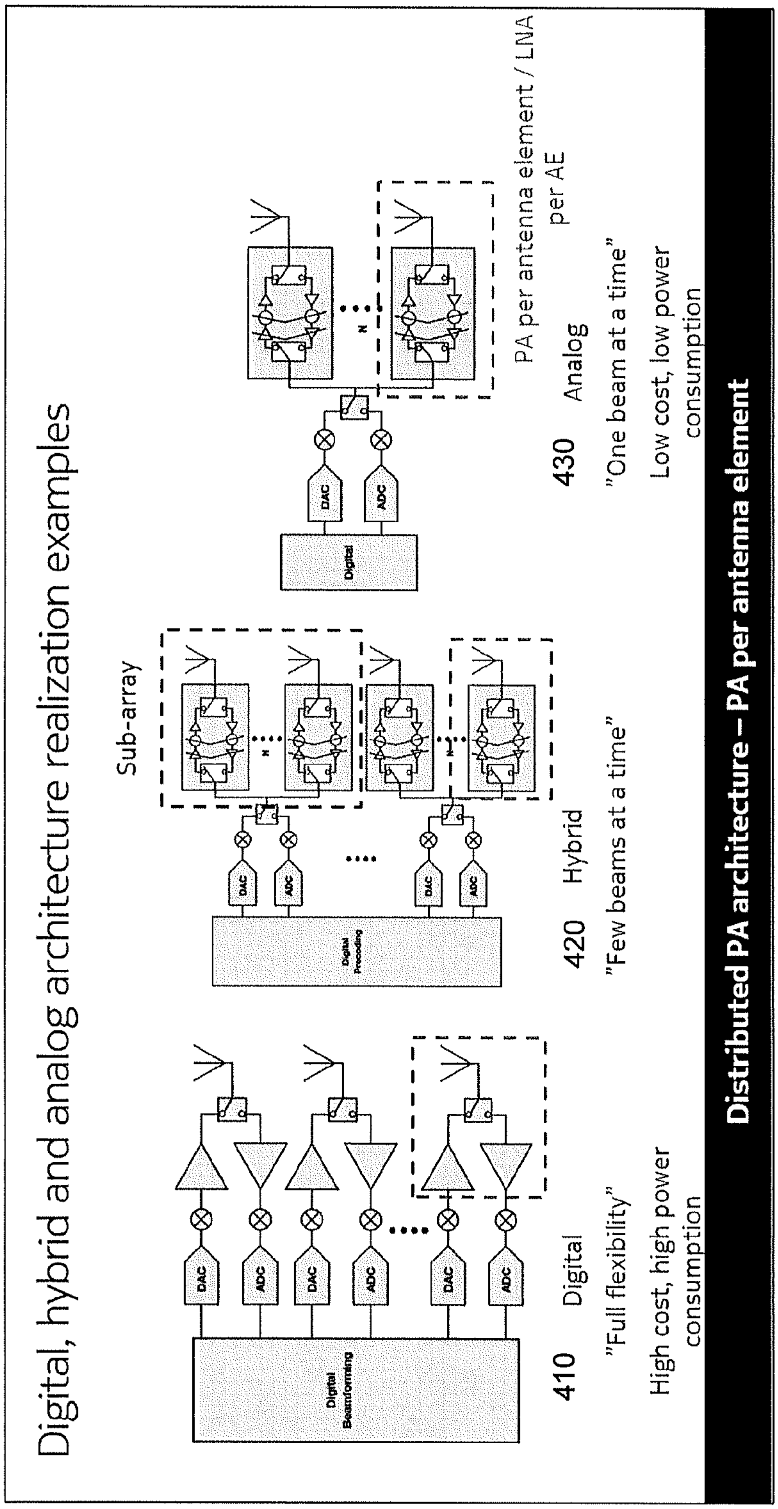
FIG. 4 is a diagram illustrating features as described herein.

A Sub-THz scenario may involve high bandwidth and a high number of antenna elements. The number of digital-to-analog and analog-to-digital converters (DAC/ADC) may vary according to architecture, as shown in the three architecture options of FIG. 4. A digital architecture (410) may provide a DAC for each transmitter/transceiver and an ADC for each receiver/transceiver. A digital architecture (410) may provide "full flexibility," but may also have a high(er) cost and high(er) power consumption. An analog architecture (430) may provide a single DAC and ADC, no matter how many antenna elements are provided. An analog architecture (430) may provide "one beam at a time," and may have a low(er) cost and low(er) power consumption. A hybrid architecture (420) may provide a DAC and ADC for a sub-array of antenna elements. A hybrid architecture (420) may provide "few beams at a time." A power amplifier (PA) may be provided per antenna element. For the analog architecture (430), a PA (e.g. low-noise amplifier (LNA)) may be provided per antenna element (AE).

The complexity and power consumption of baseband processing may depend on the number of antenna ports, i.e. how many individual digital streams are processed. It may be expected that radio frequency (RF) beamforming is deployed, meaning that signal(s) from individual antenna elements may be combined in the analog domain before conversion to the digital domain, and the number of antenna ports may be relatively low.

The power consumption of a transmitter unit (TXU) (excluding power amplifier (PA)) may be mainly due to the DAC, of which power consumption may be linearly proportional to bandwidth and exponentially proportional to the number of DAC bits (e.g. $P \approx B \times 2^{2R}$; where B is bandwidth and R is bits per sample). Other approximations of the power consumption are possible; the power consumption may also follow other functions/trends, which may vary, for example, according to technology choice.

Analog to digital conversion (ADC) may be considered the most power hungry component in an analog receiver chain, with power consumption increasing with higher sampling rate (wider bandwidth) and higher accuracy (bits per sample). The ADC/DAC complexity may be a bottleneck for UE radio frequency (RF) power consumption and cost, when operating at sub-THz frequencies. It may be noted that narrowing down the size (bandwidth) of initial bandwidth part (BWP) may not reduce the complexity enough/sufficiently, when compared to the number of ADC/DAC bits.

NR introduced the concept of multiple BWPs. However, NR does not define ADC/DAC capabilities, which are considered to be UE implementation issues. For example, initial BWP configuration (for DL) may cover only physical downlink control channel (PDCCH) and physical downlink shared channel (PDSCH)-related parameters, in addition to the SSB/PBCH (synchronization signal block/physical broadcast channel) (e.g. master information block (MIB)). Initial DL BWP may be configured in the following way: defined by span of CORESET #0 (control resource set) configured by MIB for scheduling of system information blocks (SIBs); and/or supported CORESET #0 sizes are only 24, 48, 96 resource blocks (RBs). The PDCCH and PDSCH-related parameters may be as in TS 38.311.

In example embodiments of the present disclosure, DL and/or UL bandwidth part may be arranged so as to support operation with variable resolution ADC and/or DAC.

Figure 5:
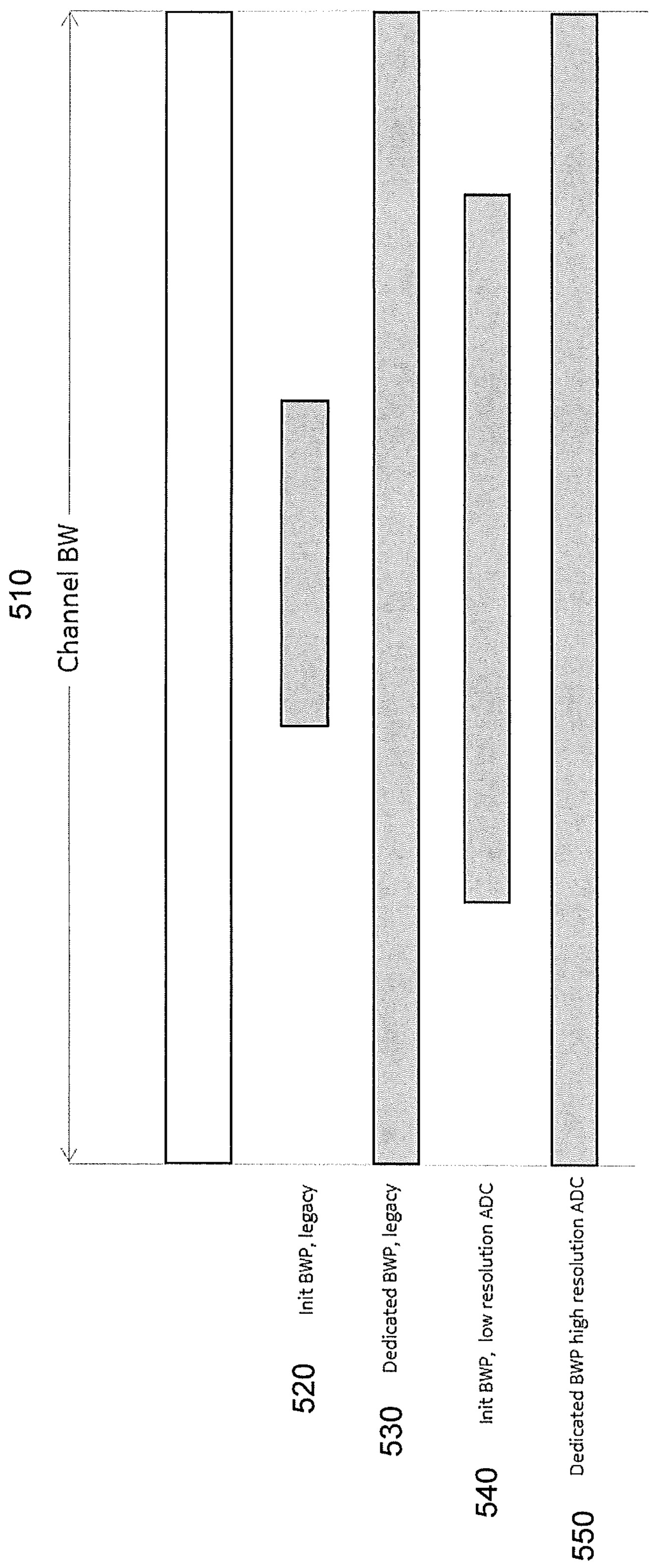
FIG. 5 is a diagram illustrating features as described herein.

In an example scenario, a cell may contain multiple DL/UL BWPs (as in the legacy cell). The principle of different DL/UL BWP configurations is illustrated in FIG. 5. In an example, (at least) one DL or UL BWP may be configured to operate according to a low number of ADC/DAC bits. The number of bits, as used in this disclosure, may refer to either the actual resolution of ADC, i.e. the number of bits used to represent the value, or equivalent number of bits (ENOB), which takes into account the imperfections of the implementation and possible oversampling gain, therefore representing the effective resolution of the ADC. Other metrics for representing ADC/DAC resolution, besides number of bits, may optionally be used.

Referring now to FIG. 5, in a legacy cell example (520), the initial BWP configuration may be smaller than the channel BW (510). In a legacy cell example (530), the dedicated BWP configuration may be equal, or substantially equal, to the channel BW (510). In a low resolution ADC example (540), the initial BWP configuration may be smaller than the channel BW (510) but of a size greater than the example 520. In a high resolution ADC example (550), the dedicated BWP configuration may be equal or substantially equal to the channel BW (510).

In an example embodiment, a UE capability may be defined for supporting a number of bits in ADC and/or DAC. For example, one UE capability, with a low dynamic range, may support only 3 or 4 bits ENOB (equivalent number of bits) in ADC and/or DACs. In another example, another UE capability, with a high dynamic range, may support e.g. 8 or 10 bits ENOB in ADC and/or DACs. The ADC and/or DAC capability may be combined with other features, such as Carrier Aggregation and/or MIMO (multiple in, multiple out). The number of component carriers configured may reduce the ENOB for ADC/DAC. Support for multi-panel reception may reduce the ENOB for ADC/DAC.

In an example embodiment, depending on the DL/UL BWP scenario, the UE capability may be defined separately for DL and UL. This may create up to four different UE capabilities with two quantization levels (i.e. a low dynamic range, a high dynamic range). In other words, a UE may have a UE capability for UL low resolution BWP, a UE capability for UL high resolution BWP, a UE capability for DL low resolution BWP, and/or a UE capability for DL high resolution BWP. The gNB may be able to switch between low resolution BWP and high resolution BWP separately in DL and UL, for example for those UEs supporting a high resolution BWP in both UL and DL. In other words, the gNB may be able to handle any of the four different UE capabilities.

While the present disclosure discusses a high resolution BWP and a low resolution BWP, additional quantization levels may be possible. For example, a UE may be capable of ADC/DAC operation at a low resolution level, a middle resolution level, and a high resolution level for one or both of UL/DL communication. This example is not limiting; a UE and/or gNB may be able to communicate via any number of resolution levels for ADC/DAC, and may have different capabilities for each of UL and DL. In a nonlimiting example, a UE may be capable of UL communication with a first level of resolution, and may be capable of DL communication with any of, for example, four levels of resolution.

The low dynamic range BWP may operate according to a low number of ADC/DAC bits. In an example, the low dynamic range BWP may be characterized by at least one of the following properties: default BWP (or initial BWP) supported by all UEs; operates according to a single carrier waveform (e.g. as DFT-S-OFDM (Discrete Fourier transform spread orthogonal frequency division multiplexing)); operates according to spectrum shaping (such as frequency domain spectrum shaping); operates according to spectrum extension (a.k.a. roll-off); operates according to limited maximum modulation order (e.g. max QPSK (quadrature phase shift keying)); operates according to time division multiplexing (TDM) between control, data, and reference signals (RS); operates according to a first set of RF requirements; and/or operates according to a first set of demodulation requirements.

The high dynamic range BWP may operate according to a high number of ADC/DAC bits. For example, the high dynamic range BWP may be characterized by at least one of the following properties: dedicated BWP configuration not supported by all UEs; operates according to multi-carrier waveform (such as orthogonal frequency division multiplexing (OFDM)); operates according to all supported modulation orders (e.g. up-to 64QAM (quadrature amplitude modulation) or 256QAM); supports frequency division multiplexing (FDM) between control, data, and RS; operates according to a first set of RF requirements; and/or operates according to a first set of demodulation requirements.

In an example embodiment, separate RAN4 requirements may be defined for different UE capabilities. These RAN4 requirements may be reported from a UE to a gNB (i.e. as part of the UE capability info). The gNB may then determine how to take this information into account. A technical effect of this may be to provide additional margin for the quantization error. For example, UE Tx error vector magnitude (EVM) requirements may be defined according to DAC capability. In another example, UE Rx demodulation requirements may be defined according to ADC capability.

In an example, when switching between BWPs having different resolutions/dynamic ranges happens, it may occur based on a (dedicated) RRC configuration and may be initiated by the gNB. It may be that all gNBs support operation according to high-resolution BWP. However, if a gNB only supports low resolution BWP (in DL and/or UL), it may not switch the high resolution BWP on.

A technical effect of example embodiments of the present disclosure may be to arrange the DL and/or UL bandwidth part in a way that supports operation with variable resolution ADC and/or DAC. The initial BWP may be designed according to low resolution ADC and/or DAC. In an example embodiment, when a gNB becomes aware of the UE's capability of indicating that the UE is capable of operating with a high dynamic range for ADC or DAC, it may configure a dedicated bandwidth part (BWP) by instructing the UE to start operating with a second DL BWP associated with a high dynamic range for ADC and/or a second UL BWP associated with a high dynamic range for DAC, which may be different from the initial BWP.

In an example embodiment, the initial BWP may be designed according to low resolution ADC and/or DAC. When the gNB becomes aware of the UE's capability, it may configure dedicated BWP based on such capability.

In an example embodiment, a UE performing transmission or reception may perform initial access based on the first BWP. The initial access signals may comprise e.g. the following DL signals: SSB [synchronization signal (PSS/SSS), PBCH], RMSI (SIB-1), other system information (SIB-2, etc.). The initial access signals may also include UL signals as part of the RA process: PRACH and RA Message 3 or RA Message A. RA process may also involve DL signals as part of RA process: random access response (RA Msg2), and contention resolution (RA Msg4) or RA Message B. There may also be unicast data transmitted/received during and/or after initial access phase (e.g. using the first BWP). The first BWP may be configured to operate according to a low dynamic range for at least one of ADC or DAC. The first BWP may be a low resolution configuration for ADC/DAC. A configuration for the first BWP may be determined by the UE based on a received physical broadcast channel (PBCH) packet and/or a system information block (e.g. SIB1).

In an example embodiment, the UE may indicate UE capability to the gNB. For example, the UE capability may indicate/include/comprise at least one parameter indicative of a number of bits for at least one of ADC or DAC (i.e. for at least one of UL or DL). The UE may indicate the UE capability to the gNB via RRC signaling.

In an example embodiment, the UE may receive an indication from the gNB. The indication may be received via (dedicated) RRC signaling, which may include a configuration for a new/second BWP. This may be done separately for DL BWP and UL BWP. In an example embodiment, the indication may comprise/contain/include one or more signaling messages. In one example, the indication may comprise an RRC message only, in which case both configuration of the second BWP and triggering of use of the second BWP may be received by the UE via higher layer signaling. In an example embodiment, a configuration for the second BWP may be received by the UE via (dedicated) RRC signaling. In another example, the indication may comprise an RRC message and a MAC message or DCI, in which cases, the configuration of the second BWP may be received by the UE via RRC signaling, while triggering of use of the second BWP may be received by the UE via separate signaling (e.g. MAC or DCI). In another example, the indication may comprise an RRC message and a timer, in which case the configuration of the second BWP may be received by the UE via RRC signaling, while the triggering of use of the second BWP may be performed via, for example, an inactivity timer. In other words, the gNB may trigger use of the second BWP by the UE by not transmitting to the UE for a period of time (i.e. until the inactivity timer expires). The inactivity timer may be configured, for example, via RRC signaling.

In an example embodiment, the indication received from the gNB may instruct the UE to start operating according to a high number of bits for at least one of ADC or DAC. In other words, the indication may instruct the UE to switch BWP for DL and/or UL. The UE may receive (dedicated) RRC signaling that includes one or more parameters for operating on the new/second BWP for at least one of ADC or DAC, which may include a higher number of bits. For example, the one or more parameters may include subcarrier spacing, PDCCH configuration, etc. for operating on the new BWP.

In an example embodiment, the indication received from the gNB after the UE has indicated a capability for using a higher resolution configuration for ADC/DAC may contain a trigger configured to indicate to the UE to use the new BWP, the configuration for which may have been previously signaled to the UE. The indication/trigger may be signaled via RRC signaling, signaled via use of a downlink control information (DCI) (e.g. PDDCH) received by the UE, and/or indicated via expiration of a timer. A timer-based indication for the UE to switch to a configuration with a different resolution for ADC/DAC may be used, for example, when switching from a higher resolution configuration/BWP to a lower resolution configuration/BWP.

Figure 6A:
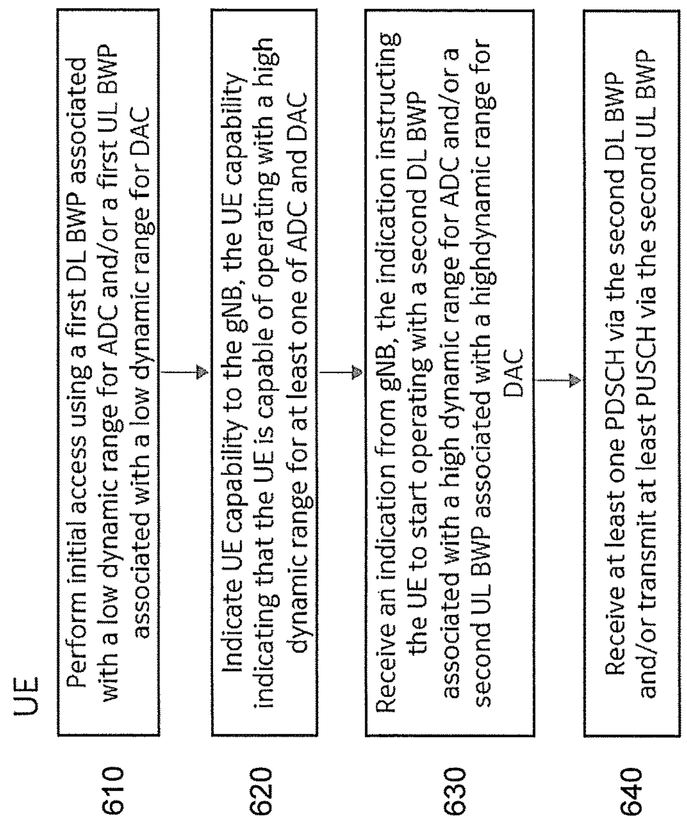
FIG. 6*a* is a flowchart illustrating features as described herein.

Referring now to FIG. 6*a*, illustrated is a flowchart illustrating potential steps of a user equipment according to an example embodiment of the present disclosure. At 610, the UE may perform initial access using a first DL BWP associated with a low dynamic range for ADC and/or a first UL BWP associated with a low dynamic range for DAC. Performing initial access may include the UE performing one or more of the following: detecting PSS/SSS; reading PBCH, reading PDCCH from CORESET #0, reading SIB-1 from PDSCH, reading other PDSCH(s) including other SIBs, sending a physical random access channel (PRACH) packet/message, sending random access (RA) Message 3, sending PUSCH/PUCCH, etc. The initial access phase ends when the RRC connection has been established (i.e. UE has moved from Idle to RRC connected state).

At 620, the UE may indicate UE capability to the gNB, the UE capability indicating that the UE is capable of operating with a high dynamic range for at least one of ADC and DAC. At 630, the UE may receive an indication from the gNB, the indication instructing the UE to start operating with a second DL BWP associated with a high dynamic range for ADC and/or a second UL BWP associated with a high dynamic range for DAC. At 640, the UE may receive at least one physical downlink shared channel (PDSCH) message/packet via the second DL BWP and/or transmit at least one physical uplink shared channel (PUSCH) message/packet via the second UL BWP.

Figure 6B:
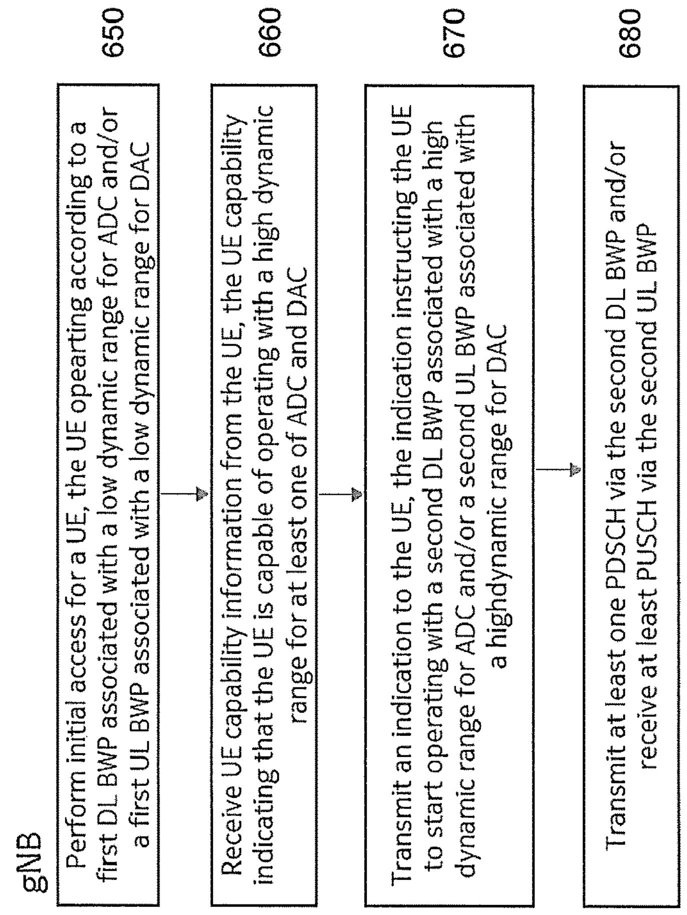
FIG. 6*b* is a flowchart illustrating features as described herein.

Referring now to FIG. 6*b*, illustrated is a flowchart illustrating potential steps of a base station according to an example embodiment of the present disclosure. At 650, the gNB may perform initial access for a UE, the UE operating according to a first DL BWP associated with a low dynamic range for ADC and/or a first UL BWP associated with a low dynamic range for DAC. At 660, the gNB may receive UE capability information from the UE, the UE capability indicating that the UE is capable of operating with a high dynamic range for at least one of ADC and DAC. At 670, the gNB may transmit an indication to the UE, the indication instructing the UE to start operating with a second DL BWP associated with a high dynamic range for ADC and/or a second UL BWP associated with a high dynamic range for DAC. At 680, the gNB may transmit at least one PDSCH via the second DL BWP and/or receive at least PUSCH via the second UL BWP.

The operations of the UE and the gNB may be performed in parallel. It may be noted that, if the gNB is not capable of performing communication with a UE using a high(er) dynamic range for ADC/DAC, the gNB may not transmit an indication to the UE to switch to a second BWP. In other words, the UE may only switch to use of a second BWP if an indication to do so is received by the UE.

A technical effect of example embodiments of the present disclosure may be to allow (substantially) simultaneous operation with different UE capabilities (in terms of ADC/DAC). In example embodiments of the present disclosure, certain UE capabilities may be targeted to power limited scenarios, while other UE capabilities may be targeted to maximize the peak data rate. The UE capabilities may relate to UE cost and/or achievable data rate.

Referring now to FIG. 7, illustrated are examples of the EVM performance (e.g. contribution from DAC linear PA) in the case of 2 bits DAC and 4 bits DAC (e.g. low resolution DAC). In the illustrated examples, DET-s-OFDM is used. The simulation is done for different waveforms, and modulation orders. The result shows that a low peak to average power ratio (PAPR) waveform provides better EVM performance (compared to waveform that has not been optimized for PAPR). The result also shows that low modulation order provides better EVM performance (compared to high modulation order). The result also shows that low BW allocation provides better EVM performance (compared to high BW allocation).

Figure 8:
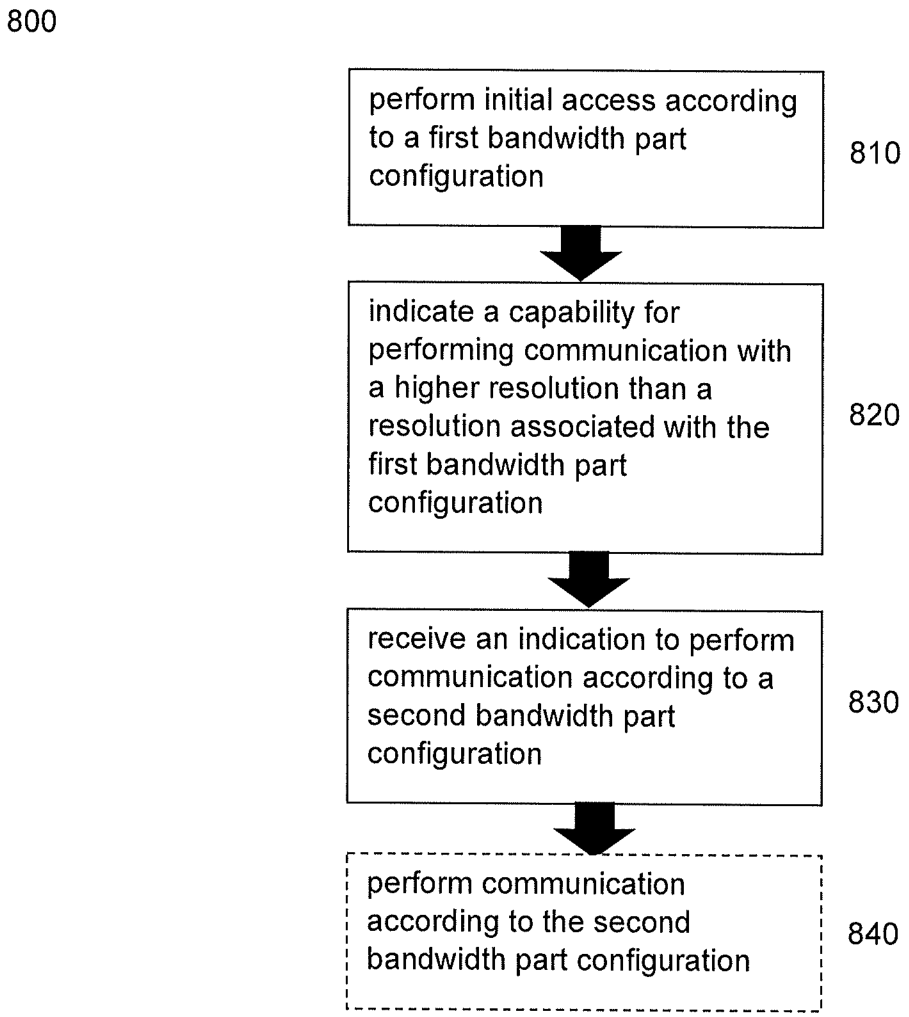
FIG. 8 is a flowchart illustrating steps as described herein.

FIG. 8 illustrates the potential steps of an example method 800. The example method 800 may include: performing initial access according to a first bandwidth part configuration, 810; indicating a capability for performing communication with a higher resolution than a resolution associated with the first bandwidth part configuration, 820; and receiving an indication to perform communication according to a second bandwidth part configuration, 830. Optionally, the example method 800 may include: performing communication according to the second bandwidth part configuration, 840. The example method 800 may, optionally, be performed with a UE.

Figure 9:
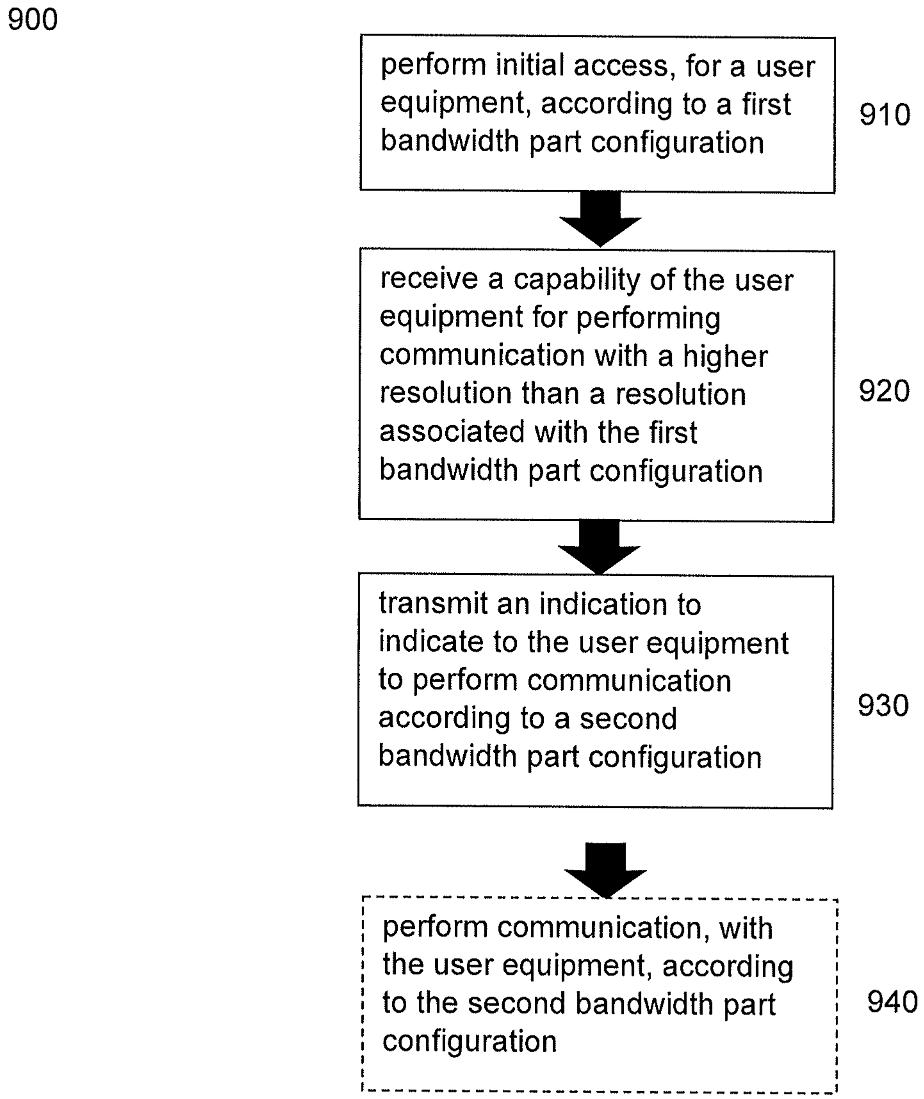
FIG. 9 is a flowchart illustrating steps as described herein.

FIG. 9 illustrates the potential steps of an example method 900. The example method 900 may include: performing initial access, for a user equipment, according to a first bandwidth part configuration, 910; receiving a capability of the user equipment for performing communication with a higher resolution than a resolution associated with the first bandwidth part configuration, 920; and transmitting an indication to indicate to the user equipment to perform communication according to a second bandwidth part configuration, 930. Optionally, the example method 900 may include: performing communication, with the user equipment, according to the second bandwidth part configuration, 940. The example method 900 may, optionally, be performed with a gNB.

In accordance with one example embodiment, an apparatus may comprise: at least one processor; and at least one memory including computer program code; the at least one memory and the computer program code configured to, with the at least one processor, cause the apparatus at least to perform: perform initial access according to a first bandwidth part configuration; station, a capability for performing indicate, to a base communication with a higher resolution than a resolution associated with the first bandwidth part configuration; and receive, from the base station, an indication to perform communication according to a second bandwidth part configuration.

The received indication may comprise at least one of: one or more configuration parameters for a downlink high resolution bandwidth part configuration, one or more configuration parameters for an uplink high resolution bandwidth part configuration, or a trigger configured to instruct the apparatus to switch from use of the first bandwidth part configuration to use of the second bandwidth part configuration, wherein the second bandwidth part configuration may comprise at least one of: the downlink high resolution configuration, or the uplink high resolution bandwidth part configuration.

The example apparatus may be further configured to: perform according to the second bandwidth part configuration.

The example apparatus may be further configured to: switch from use of the second bandwidth part configuration to use of the first bandwidth part configuration based on one of: an explicit indication received via one of radio resource control signaling, medium access control signaling, or downlink control information signaling, or an implicit indication, wherein the implicit indication may be based, at least partially, on a predefined inactivity timer; and perform communication according to the first bandwidth part configuration.

Performing according communication to the second bandwidth part configuration may comprise the example apparatus being further configured to: receive at least one physical downlink shared channel message according to the second bandwidth part configuration, or transmit at least one physical uplink shared channel message according to the second bandwidth part configuration.

The first bandwidth part configuration may comprise a low dynamic range for at least one of: analog to digital conversion, or digital to analog conversion.

The first bandwidth part configuration may comprise at least one of: a default range, operation according to a single carrier waveform, operation according to spectrum shaping, operation according to spectrum extension, operation according to a limited maximum modulation order, operation according to time division multiplexing, operation according to a first set of radio frequency requirements, or operation according to a first set of demodulation requirements.

The indicated capability may comprise at least one parameter indicative of a number of bits for at least one of: analog to digital conversion, or digital to analog conversion.

The second bandwidth part configuration may comprise a high dynamic range for at least one of: analog to digital conversion, or digital to analog conversion.

The second bandwidth part configuration may comprise at least one of: a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

The number of bits associated with the first bandwidth part configuration may be based on one of: an actual resolution, or an effective resolution, of one of: analog to digital conversion, or digital to analog conversion.

The number of bits associated with the second bandwidth part configuration may be based on one of: an actual resolution, or an effective resolution, of one of: analog to digital conversion, or digital to analog conversion.

The example apparatus may be further configured to: perform at least one of: carrier aggregation, or multiple in, multiple out communication.

The example apparatus may be configured with a plurality of bandwidth part configurations, wherein the plurality of bandwidth part configurations may comprise, at least, the first bandwidth part configuration and the second bandwidth part configuration, wherein the plurality of bandwidth part configurations may be associated with respective different resolutions.

In accordance with one aspect, an example method may be provided comprising: performing initial access according to a first bandwidth part configuration; indicating, to a base station, a capability for performing communication with a higher resolution than a resolution associated with the first bandwidth part configuration; and receiving, from the base station, an indication to perform communication according to a second bandwidth part configuration.

The received indication may comprise at least one of: one or more configuration parameters for a downlink high resolution bandwidth part configuration, one or more configuration parameters for an uplink high resolution bandwidth part configuration, or a trigger configured to instruct the apparatus to switch from use of the first bandwidth part configuration to use of the second bandwidth part configuration, wherein the second bandwidth part configuration may comprise at least one of: the downlink high resolution configuration, or the uplink high resolution bandwidth part configuration.

The example method may further comprise: performing communication the second according to bandwidth part configuration.

The example method may further comprise: switching from use of the second bandwidth part configuration to use of the first bandwidth part configuration based on one of: an explicit indication received via one of radio resource control signaling, medium access control signaling, or downlink control information signaling, or an implicit indication, wherein the implicit indication may be based, at least partially, on a predefined inactivity timer; and performing communication according to the first bandwidth part configuration.

The first bandwidth part configuration may comprise a low dynamic range for at least one of: analog to digital conversion, or digital to analog conversion.

The first bandwidth part configuration may comprise at least one of: a default range, operation according to a single carrier waveform, operation according to spectrum shaping, operation according to spectrum extension, operation according to a limited maximum modulation order, operation according to time division multiplexing, operation according to a first set of radio frequency requirements, or operation according to a first set of demodulation requirements.

The indicated capability may comprise at least one parameter indicative of a number of bits for at least one of: analog to digital conversion, or digital to analog conversion.

The second bandwidth part configuration may comprise a high dynamic range for at least one of: analog to digital conversion, or digital to analog conversion.

The second bandwidth part configuration may comprise at least one of: a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

In accordance with one example embodiment, an apparatus may comprise: circuitry configured to: perform initial access according to a first bandwidth part configuration; indicate, to a base station, a capability for performing communication with a higher resolution than a resolution associated with the first bandwidth part configuration; and receive, from the base station, an indication to perform communication according to a second bandwidth part configuration.

In accordance with one example embodiment, an apparatus may comprise: processing circuitry; memory circuitry including computer program code, the memory circuitry and the computer program code configured to, with the processing circuitry, enable the apparatus to: perform initial access according to a first bandwidth part configuration; indicate, to a base station, a capability for performing communication with a higher resolution than a resolution associated with the first bandwidth part configuration; and receive, from the base station, an indication to perform communication according to a second bandwidth part configuration.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or hardware digital circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: initial access according to a first bandwidth part configuration; indicating, to a base station, a capability for performing communication with a higher resolution than a resolution associated with the first bandwidth part configuration; and receiving, from the base station, an indication to perform communication according to a second bandwidth part configuration.

In accordance with one example embodiment, a non-transitory computer-readable medium comprising program instructions stored thereon which, when executed with at least one processor, cause the at least one processor to: perform initial access according to a first bandwidth part configuration; indicate, to a base a station, capability for performing communication with a higher resolution than a resolution associated with the first bandwidth part configuration; and receive, from the base station, an indication to perform communication according to a second bandwidth part configuration.

In accordance with another example embodiment, a non-transitory program storage device readable by a machine may be provided, tangibly embodying a program of instructions executable by the machine for performing operations, the operations comprising: perform initial access according to a first bandwidth part configuration; indicate, to a base station, a capability for performing communication with a higher resolution than a resolution associated with the first bandwidth part configuration; and receive, from the base station, an indication to perform communication according to a second bandwidth part configuration.

In accordance with one example embodiment, an apparatus may comprise: at least one processor; and at least one memory including computer program code; the at least one memory and the computer program code configured to, with the at least one processor, cause the apparatus at least to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

The initial access may comprise at least one of: a SSB transmission, a PBCH transmission, a SIB1 transmission, a PRACH reception, an RA Message 3 reception, or a RAR transmission.

The transmitted indication may comprise at least one of: one or more configuration parameters for a downlink high resolution bandwidth part configuration, one or more configuration parameters for an uplink high resolution bandwidth part configuration, or a trigger configured to instruct the user equipment to switch from use of the first bandwidth part configuration to use of the second bandwidth part configuration, wherein the second bandwidth part configuration may comprise at least one of: the downlink high resolution configuration, or the uplink high resolution bandwidth part configuration.

The example apparatus may be further configured to: perform communication, with the user equipment, according to the second bandwidth part configuration.

The example apparatus may be further configured to: switch from use of the second bandwidth part configuration to use of the first bandwidth part configuration based on one of: an explicit indication transmitted via one of radio resource control signaling, medium access control signaling, or downlink control information signaling, or an implicit indication, wherein the implicit indication may be based, at least partially, on a predefined inactivity timer; and perform communication, with the user equipment, according to the first bandwidth part configuration.

Performing communication according to the second bandwidth part configuration may comprise the example embodiment being configured to: receive at least one physical uplink shared channel message according to the second bandwidth part configuration, or transmit at least one physical downlink shared channel message second according to the bandwidth part configuration.

The first bandwidth part configuration may comprise a low dynamic range for at least one of: analog to digital conversion, or digital to analog conversion.

The first bandwidth part configuration may comprise at least one of: a default range, operation according to a single carrier waveform, operation according to spectrum shaping, operation according to spectrum extension, operation according to a limited maximum modulation order, operation according to time division multiplexing, operation according to a first set of radio frequency requirements, or operation according to a first set of demodulation requirements.

The received capability may comprise at least one parameter indicative of a number of bits for at least one of: analog to digital conversion, or digital to analog conversion.

The second bandwidth part configuration may comprise a high dynamic range for at least one of: analog to digital conversion, or digital to analog conversion.

The second bandwidth part configuration may comprise at least one of: a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

The number of bits associated with the first bandwidth part configuration may be based on one of: an actual resolution, or an effective resolution, of one of: analog to digital conversion, or digital to analog conversion.

The number of bits associated with the second bandwidth part configuration may be based on one of: an actual resolution, or an effective resolution, of one of: analog to digital conversion, or digital to analog conversion.

In accordance with one aspect, an example method may be provided comprising: performing initial access, for a user equipment, according to a first bandwidth part configuration; receiving a capability of the user equipment for performing communication with a higher resolution than a resolution associated with the first bandwidth part configuration; and transmitting an indication to indicate to the user equipment to perform communication according to a second bandwidth part configuration.

The transmitted indication may comprise at least one of: one or more configuration parameters for a downlink high resolution bandwidth part configuration, one or more configuration parameters for an uplink high resolution bandwidth part configuration, or a trigger configured to instruct the user equipment to switch from use of the first bandwidth part configuration to use of the second bandwidth part configuration, wherein the second bandwidth part configuration may comprise at least one of: the downlink high resolution configuration, or the uplink high resolution bandwidth part configuration.

The example method may further comprise: performing communication, with the user equipment, according to the second bandwidth part configuration.

The example method may further comprise: switch from use of the second bandwidth part configuration to use of the first bandwidth part configuration based on one of: an explicit indication transmitted via one of radio resource control signaling, medium access control signaling, or downlink control information signaling, or an implicit indication, wherein the implicit indication may be based, at least partially, on a predefined inactivity timer; and performing communication, with the user equipment, according to the first bandwidth part configuration.

The first bandwidth part configuration may comprise a low dynamic range for at least one of: analog to digital conversion, or digital to analog conversion.

The first bandwidth part configuration may comprise at least one of: a default range, operation according to a single carrier waveform, operation according to spectrum shaping, operation according to spectrum extension, operation according to a limited maximum modulation order, operation according to time division multiplexing, operation according to a first set of radio frequency requirements, or operation according to a first set of demodulation requirements.

The received capability may comprise at least one parameter indicative of a number of bits for at least one of: analog to digital conversion, or digital to analog conversion.

The second bandwidth part configuration may comprise a high dynamic range for at least one of: analog to digital conversion, or digital to analog conversion.

The second bandwidth part configuration may comprise at least one of: a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

The number of bits associated with the first bandwidth part configuration may be based on one of: an actual resolution, or an effective resolution, of one of: analog to digital conversion, or digital to analog conversion.

The number of bits associated with the second bandwidth part configuration may be based on one of: an actual resolution, or an effective resolution, of one of: analog to digital conversion, or digital to analog conversion.

In accordance with one example embodiment, an apparatus may comprise: circuitry configured to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

In accordance with one example embodiment, an apparatus may comprise: processing circuitry; memory circuitry including computer program code, the memory circuitry and the computer program code configured to, with the processing circuitry, enable the apparatus to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

In accordance with one example embodiment, an apparatus may comprise means for performing: initial access, for a user equipment, according to a first bandwidth part configuration; receiving a capability of the user equipment for performing communication with a higher resolution than a resolution associated with the first bandwidth part configuration; and transmitting an indication to indicate to the user equipment to perform communication according to a second bandwidth part configuration.

In accordance with one example embodiment, a non-transitory computer-readable medium comprising program instructions stored thereon which, when executed with at least one processor, cause the at least one processor to: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

In accordance with another example embodiment, a non-transitory program storage device readable by a machine may be provided, tangibly embodying a program of instructions executable by the machine for performing operations, the operations comprising: perform initial access, for a user equipment, according to a first bandwidth part configuration; receive a capability of the user equipment for performing communication with a higher resolution than a resolution associated with the first bandwidth part configuration; and transmit an indication to indicate to the user equipment to perform communication according to a second bandwidth part configuration.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
- at least one processor; and
- at least one non-transitory memory including computer program code;
- the at least one memory and the computer program code configured to, with the at least one processor, cause the apparatus at least to:
  - perform initial access according to a first bandwidth part configuration; indicate, to a base station, a capability for performing communication with a higher resolution than a resolution associated with the first bandwidth part configuration;
  - receive, from the base station, an indication to perform communication according to a second bandwidth part configuration; and
  - perform communication according to the second bandwidth part configuration,
- wherein the first bandwidth part configuration comprises a low dynamic range for at least one of: analog to digital conversion, or digital to analog conversion; and
- wherein the indicated capability comprises at least one parameter indicative of a number of bits for at least one of: analog to digital conversion, or digital to analog conversion.

2. The apparatus of claim 1, wherein the received indication comprises at least one of:
- one or more configuration parameters for a downlink high resolution bandwidth part configuration;
- one or more configuration parameters for an uplink high resolution bandwidth part configuration; or
- a trigger configured to instruct the apparatus to switch from use of the first bandwidth part configuration to use of the second bandwidth part configuration;
- wherein the second bandwidth part configuration comprises at least one of: the downlink high resolution configuration, or the uplink high resolution bandwidth part configuration.

3. The apparatus of claim 1, wherein the at least one memory and the computer program code are configured to, with the at least one processor, cause the apparatus to:
- switch from use of the second bandwidth part configuration to use of the first bandwidth part configuration based on one of:
  - an explicit indication received via one of radio resource control signaling, medium access control signaling, or downlink control information signaling, or
  - an implicit indication, wherein the implicit indication is based, at least partially, on a predefined inactivity timer; and
- perform communication according to the first bandwidth part configuration.

4. The apparatus of claim 3, wherein performing communication according to the second bandwidth part configuration comprises the at least one memory and the computer program code are configured to, with the at least one processor, cause the apparatus at least to:
- receive at least one physical downlink shared channel message according to the second bandwidth part configuration, or
- transmit at least one physical uplink shared channel message according to the second bandwidth part configuration.

5. The apparatus of claim 1, wherein the first bandwidth part configuration comprises at least one of:
- a default range,
- operation according to a single carrier waveform,
- operation according to spectrum shaping,
- operation according to spectrum extension,
- operation according to a limited maximum modulation order,
- operation according to time division multiplexing,
- operation according to a first set of radio frequency requirements, or
- operation according to a first set of demodulation requirements.

6. The apparatus of claim 1, wherein the indicated capability comprises at least one parameter indicative of a number of bits for at least one of: analog to digital conversion, or digital to analog conversion.

7. The apparatus of claim 1, wherein the second bandwidth part configuration comprises at least one of:

a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

8. The apparatus of claim 1, wherein the number of bits associated with the first bandwidth part configuration is based on one of: an actual resolution, or an effective resolution, of one of: analog to digital conversion, or digital to analog conversion; and wherein the number of bits associated with the second bandwidth part configuration is based on one of: an actual resolution, or an effective resolution, of one of: analog to digital conversion, or digital to analog conversion.

9. The apparatus of claim 1, wherein the at least one memory and the computer program code are configured to, with the at least one processor, cause the apparatus to perform at least one of:

carrier aggregation, or multiple in, multiple out communication.

10. The apparatus of claim 1, wherein the apparatus is configured with a plurality of bandwidth part configurations, wherein the plurality of bandwidth part configurations comprises, at least, the first bandwidth part configuration and the second bandwidth part configuration, wherein the plurality of bandwidth part configurations are associated with respective different resolutions.

11. A method, comprising:

performing initial access according to a first bandwidth part configuration;

indicating, to a base station, a capability for performing communication with a higher resolution than a resolution associated with the first bandwidth part configuration; and receiving, from the base station, an indication to perform communication according to a second bandwidth part configuration, wherein the first bandwidth part configuration comprises a low dynamic range for at least one of: analog to digital conversion, or digital to analog conversion; and wherein the indicated capability comprises at least one parameter indicative of a number of bits for at least one of: analog to digital conversion, or digital to analog conversion.

12. An apparatus, comprising:

at least one processor; and at least one non-transitory memory including computer program code;

the at least one memory and the computer program code configured to, with the at least one processor, cause the apparatus at least to:

perform initial access, for a user equipment, according to a first bandwidth part configuration;

receive a capability of the user equipment for performing communication with a higher resolution than a resolution associated with the first bandwidth part configuration; and transmit an indication to indicate to the user equipment to perform communication according to a second bandwidth part configuration;

perform communication, with the user equipment, according to the second bandwidth part configuration, wherein the first bandwidth part configuration comprises a low dynamic range for at least one of:

analog to digital conversion, or digital to analog conversion; and wherein the second bandwidth part configuration comprises a high dynamic range for at least one of: analog to digital conversion, or digital to analog conversion.

13. The apparatus of claim 12, wherein the transmitted indication comprises at least one of:

one or more configuration parameters for a downlink high resolution bandwidth part configuration;

one or more configuration parameters for an uplink high resolution bandwidth part configuration; or a trigger configured to instruct the user equipment to switch from use of the first bandwidth part configuration to use of the second bandwidth part configuration;

wherein the second bandwidth part configuration comprises at least one of: the downlink high resolution configuration, or the uplink high resolution bandwidth part configuration.

14. The apparatus of claim 12, wherein the at least one memory and the computer program code are configured to, with the at least one processor, cause the apparatus to:

switch from use of the second bandwidth part configuration to use of the first bandwidth part configuration based on one of:

an explicit indication transmitted via one of radio resource control signaling, medium access control signaling, or downlink control information signaling, or an implicit indication, wherein the implicit indication is based, at least partially, on a predefined inactivity timer; and perform communication, with the user equipment, according to the first bandwidth part configuration.

15. The apparatus of claim 12, wherein performing communication according to the second bandwidth part configuration comprises the at least one memory and the computer program code are configured to, with the at least one processor, cause the apparatus at least to:

receive at least one physical uplink shared channel message according to the second bandwidth part configuration, or transmit at least one physical downlink shared channel message according to the second bandwidth part configuration.

16. The apparatus of claim 12, wherein the first bandwidth part configuration comprises at least one of:

a default range, operation according to a single carrier waveform, operation according to spectrum shaping, operation according to spectrum extension, operation according to a limited maximum modulation order, operation according to time division multiplexing, operation according to a first set of radio frequency requirements, or operation according to a first set of demodulation requirements.

17. The apparatus of claim 12, wherein the received capability comprises at least one parameter indicative of a number of bits for at least one of: analog to digital conversion, or digital to analog conversion.

18. The apparatus of claim 12, wherein the second bandwidth part configuration comprises at least one of:

a dedicated bandwidth part configuration, operation according to a multi-carrier waveform, operation according to a plurality of supported modulation orders, operation according to frequency division multiplexing, operation according to a first set of radio frequency requirements, or operation according to a first set of demodulation requirements.

* * * * *